United States Patent

Nakanuma et al.

[15] 3,663,871

[45] May 16, 1972

[54] MIS-TYPE SEMICONDUCTOR READ ONLY MEMORY DEVICE AND METHOD OF MANUFACTURING THE SAME

[72] Inventors: Sho Nakanuma; Tohru Tsujide; Toshio Wada, all of Tokyo, Japan

[73] Assignee: Nippon Electric Company, Limited, Tokyo, Japan

[22] Filed: Feb. 16, 1970

[21] Appl. No.: 11,426

[30] Foreign Application Priority Data

Feb. 18, 1969 Japan....................................44/2020

[52] U.S. Cl...................317/235 R, 317/235 B, 317/235 AG, 340/173

[51] Int. Cl...........................................................H01l 11/14

[58] Field of Search.........................317/235 B, 235 AG, 235; 340/173

[56] References Cited

UNITED STATES PATENTS

| | | | |
|---|---|---|---|
| 3,549,991 | 12/1970 | Scott | 307/279 |
| 3,502,950 | 3/1970 | Nigh et al. | 317/235 |
| 3,530,443 | 9/1970 | Crafts et al. | 340/173 |
| 3,556,966 | 1/1971 | Waxman et al. | 204/164 |
| 3,528,064 | 9/1970 | Everhart | 340/173 |

*Primary Examiner*—John W. Huckert
*Assistant Examiner*—Martin H. Edlow
*Attorney*—Sandoe, Hopgood and Calimafde

[57] ABSTRACT

A metal-insulator-semiconductor (MIS) semiconductor read-only memory element employs, as the gate insulator film, an alumina film formed through a novel hydrolytic deposition process.

2 Claims, 7 Drawing Figures

INVENTORS
SHO NAKANUMA
TOHRU TSUJIDE
TOSHIO WADA
by
Sandoe, Hopgood & Calimafde
ATTORNEYS INVENTORS
SHO NAKANUMA
TOHRU TSUJIDE
TOSHIO WADA
by
Sandoe, Hopgood & Calimafde
ATTORNEYS

*INVENTORS*
SHO NAKANUMA
TOHRU TSUJIDE
TOSHIO WADA
*by*
Sandoe, Hopgood & Calimafde
ATTORNEYS

MIS-TYPE SEMICONDUCTOR READ ONLY MEMORY DEVICE AND METHOD OF MANUFACTURING THE SAME

This invention relates to a metal-insulator-semiconductor type (MIS) semiconductor device and, more particularly, to an insulated gate type MIS semiconductor device suited for use as a read-only memory device.

Owing to the rapid increase in the quantity of information to be processed by computers, the demand for a more efficient non-destructive read-only memory has become increasingly great. A memory device, to be suited for read-only memory, should be miniature in size, inexpensive to manufacture, stable in its memory function, and capable of maintaining the memory contents even when it is removed from a computer.

Magnetic memory devices have chiefly been employed as read-only memories. However, they are not satisfactory in that their high-speed function is rather limited, that complicated associated electronic circuits are needed, that miniaturization of these devices is very difficult, and that the overall cost of their manufacture is rather high. A flip-flop matrix fabricated in the form of a bipolar semiconductor integrated circuit may be employed for this purpose. This however involves a complicated process of manufacture and a correspondingly low reliability.

In order to simplify the semiconductor matrix memory, various proposals have been made. The most feasible of these employs insulated-gate type field-effect transistors (FET). Such proposals are exemplified by a paper published in Applied Physics Letters Vol. 12, No. 8 (1968), pp. 260 – 263 and R.E. Oleksiak's report titled "The variable Threshold Transistor, A New Electrically Alterable, Non-Destructive Read-Only Storage Device" presented at the International Electron Devices Meeting (October 1967, Washington D.C) Stated briefly, these conventional devices employ an insulator film, typically exemplified by a silicon nitride-silicon oxide $Si_3N_4$—$Si_2$ double layer as the gate insulator film, which serves as a trapping means for charge carriers. The information storage function of the proposed device is based on the change in the internal charge of the interface between the two layers caused by the application of the predetermined voltage and maintained by the charge carrier trapping.

This structure of the proposal is, however incomplete, because the trapped charge carriers, namely electrons, tend to be released rather easily from the trapping centers. This makes the device unstable, unreliable, and unsuitable for long-duration memory. A more unfavorable characteristic of these is that the device use in a trapped charge carriers are easily released by the application of a voltage of opposite polarity, completely destroying the memory content. Therefore, the $Si_3N_4SiO_2$ double layer is not regarded as being suitable as an FET for use as a non-destructive read-only memory cell.

It is therefore an object of the present invention to provide a MIS type semiconductor device particularly well suited for non-destructive read-only memory use and a method of manufacturing the same.

According to the present invention, there is provided a MIS memory element employing, as the gate insulator film, an alumina film which is formed through a hydrolytic deposition process peculiar to this invention.

When a voltage above a certain critical value is applied across the alumina film, the film becomes negatively charged and maintained in the charged state almost permanently. This phenomenon is believed attributable to the fact that the electrons in the semiconductor substrate are injected into the film and are permanently trapped therein. The alumina film of the present invention is therefore believed to have the generation-recombination centers or trapping centers which are capable of keeping the injected electrons captured virtually permanently. An aspect of the present invention is based on this discovery.

Also, in the present device, the injection of electrons into the alumina film is observed regardless of the polarity of the applied voltage. This is probably due to the fact that the electron trapping is caused not only for those electrons injected from the semiconductor substrate but also for those electrons from the overlying electrode film. What is meant by this phenomenon is that once a voltage above a certain critical value of a given polarity is applied across the alumina film, the charged state cannot be changed by the further application of a voltage of an opposite polarity. Another aspect of the present invention is based on this discovery.

As will be seen from the foregoing description the present invention makes it possible to manufacture a highly miniaturized and simplified MIS memory device having ideal characteristics for non-destructive read-only memory use.

Now, the invention will be described in more detail in conjunction with the accompanying drawings, in which.

Figure 1:
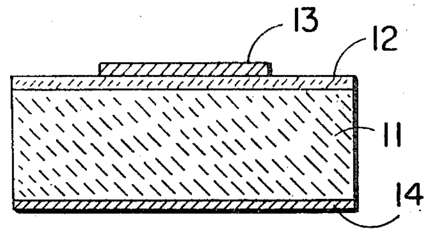
FIG. 1 is a cross-sectional view of an MIS diode manufactured according to the present invention.

Referring to FIG. 1, the MIS diode 10 of the invention has a p-type silicon single crystal substrate 11 of 2 ohm-cm. in resistivity, an alumina film 12 of 1,800 angstrom in thickness formed through a process to be described later, an overlying aluminum film electrode 13 of 1 mm. in diameter formed on film 12, and another electrode 14 formed in ohmic contact with the bottom of the substrate 11.

The alumina film 12 is formed through the following process:

EXAMPLE 1

A p-type silicon wafer of 2 ohm-cm. in resistivity polished in its major surface is put in a vapor deposition apparatus equipped with a high-frequency induction heating device, which was originally designed for vapor-phase deposition of oxide films such as $SiO_2$. The frequency used for the apparatus is in the 500-KHz band.

Into the apparatus, hydrogen gas ($H_2$) and carbon dioxide gas ($CO_2$) was introduced at the rate of 13 l./min. and 300 cc./min., respectively. Another flow of hydrogen gas ($H_2$) at the rate of 2 l./min. serves as a carrier gas for trichloro aluminum ($AlCl_3$). The rate of feeding $AlCl_3$ was 50 cc./min. The overall pressure in the furnace was maintained at 1 atmospheric pressure and the temperature was maintained at 880° C. A thin film of alumina was formed on the wafer. As is generally believed, the alumina deposition is due to the hydrolytic decomposition of $AlCl_3$. To attain the uniform thickness, the wafer was kept moving within the apparatus. About 30 minutes later, alumina film of about 2,500 angstroms in thickness was obtained.

EXAMPLE 2

The same apparatus and wafer as Example 1 was used. The rate of feeding CO2 gas was increased to 500 cc./min., with the temperature, the pressure and the flow rates of $H_2$ gas and $AlCl_3$ unchanged. About 20 minutes later, the alumina film was observed to have grown to a thickness of about 1,800 angstroms.

EXAMPLE 3

Only the temperature was lowered to 850° C., with all other factors remaining unchanged from Example 2. In this case, 20 minutes was sufficient to obtain an alumina film of a thickness of 1,800 angstroms.

Besides these examples, it has been experimentally confirmed that the processing temperature should be in the range of 650–950° C. When the temperature is lower than the lower limit value, the produced alumina film tends to easily disintegrate and to be very vulnerable to humidity. When it is higher than the upper limit temperature value, the alumina film is further crystallized and tends to be leaky. The experimental result so far obtained show that the optimum temperature lies in the range of between 800–900° C. Also, experimental results show that as well resistance heating can be used as well instead of induction heating.

Figure 2:
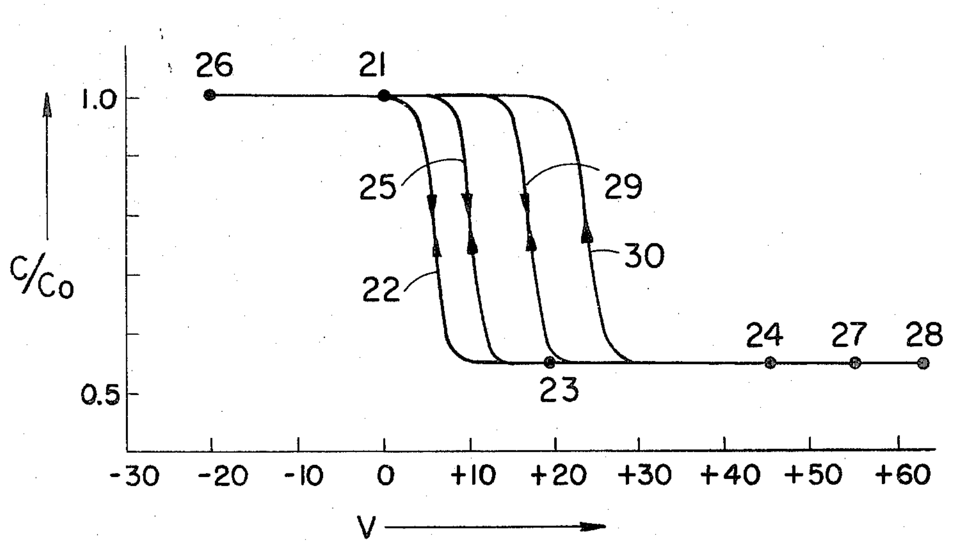
FIGS. 2 to 4 illustrate characteristic curves of the diodes of FIG. 1.

In FIG. 2 which shows the characteristics of the diode 10 of FIG. 1, the abscissa indicates the voltage V applied across the electrodes 13 and 14 while the ordinate indicates a capacitance C of the diode 10 normalized by a corresponding capacitor having a pair of metal films with the alumina film of the same area and thickness interposed between them.

The diode 10 has the normalized capacitance value 1.0 as shown by point 21 on the curves of FIG. 2. As the voltage at the electrode 13 is raised with respect to the bottom electrode 14, the capacitance exhibits the change as shown by the curve 22 to reach another state 23. One minute after this state 23 is maintained, the voltage is lowered, accompanied with the reciprocal change in the capacitance to reach the initial state 21 via curve 22. Thus, the capacitance vs. voltage curve 22 shows that no change is caused in the aluminum film 12 by the application of the voltage corresponding to the state 23. The voltage is now raised to reach the state 24 which corresponds to +45 V. After the state 24 is maintained for one minute, the voltage is lowered to come to the state 21 again. The change in capacitance this time is not as shown by curve 22 but is instead that shown by curve 25. This shift of the capacitance vs. voltage curve (hereafter abbreviated as a *c–v* curve) was not observed in those cases where the voltage was lower than +45 V. This voltage +45V may therefore be called a critical voltage on the positive region. After the state 21 is reached, the voltage was further lowered to come to a state 26 which corresponds to about −20 V. As the voltage is then raised, the capacitance vs. voltage change was plotted as shown by curve 25. When the voltage corresponding to the state 26 was lowered further to about −35 V., the *c–v* curve was observed to shift rightward. The voltage −35 V. may therefore be called the critical voltage in the negative region. The capacitance of the diode was measured by the use of a capacitance measuring equipment in common use. The frequency used for the measurement was 1 MHz.

Figure 3:
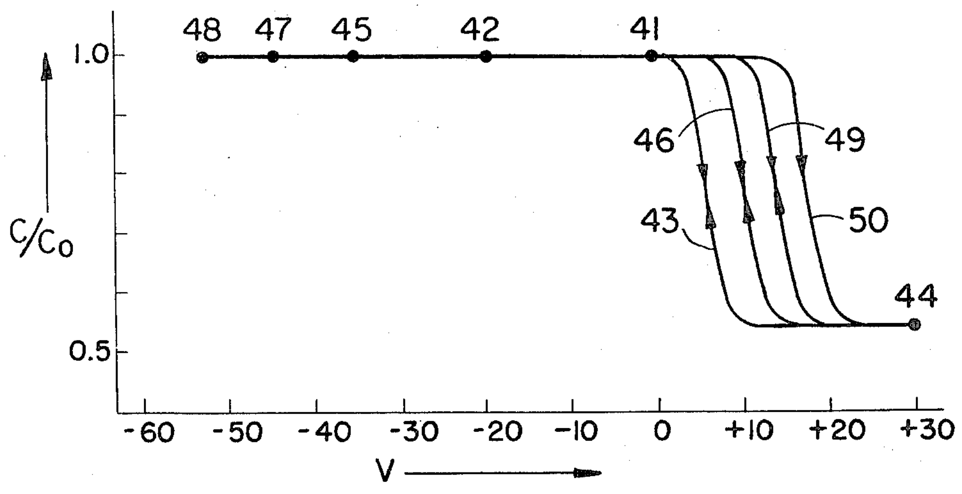

FIG. 3 shows a group of similar *c–v* curves observed in those cases where the applied voltages are far beyond the above-mentioned critical voltages in both the positive and negative regions. The voltage is lowered first from the initial state 41 to reach another state 42. A minute later, the voltage is raised to reach a state 44 corresponding to +30V. In this voltage change, curve 43 was followed. When the state 47 corresponding to a voltage of −45 V., lower than the critical voltage, was taken in advance of reaching the state 44, the capacitance change with respect to voltage is shown by curve 46 and not by curve 43. It follows therefore that the deep negative initial biasing beyond the critical voltage causes the *c–v* curve to shift in the rightward or positive direction. The shift becomes greater, when the initial biasing is further lowered, as shown by curves 49 and 50 which correspond respectively to initial setting states 47 and 48.

As will be seen from the foregoing, the diode 10 produces negative charges within the alumina film 12, regardless of the polarity of the voltage applied.

This shift of the *c–v* curves was also observed in those cases where the upper limit voltage was raised beyond the positive critical voltage +35 V. Point 51 shows such state. It was also observed that the c-v curves always shift rightward regardless of the polarity of the initial setting voltage, and that the curves once shifted by the application of the beyond-the-critical voltage is never returned to the initial state. In the most favorable case, the rightward curve shift was as high as 20 volts in terms of the applied voltage shown along the abscissa.

Figure 4:
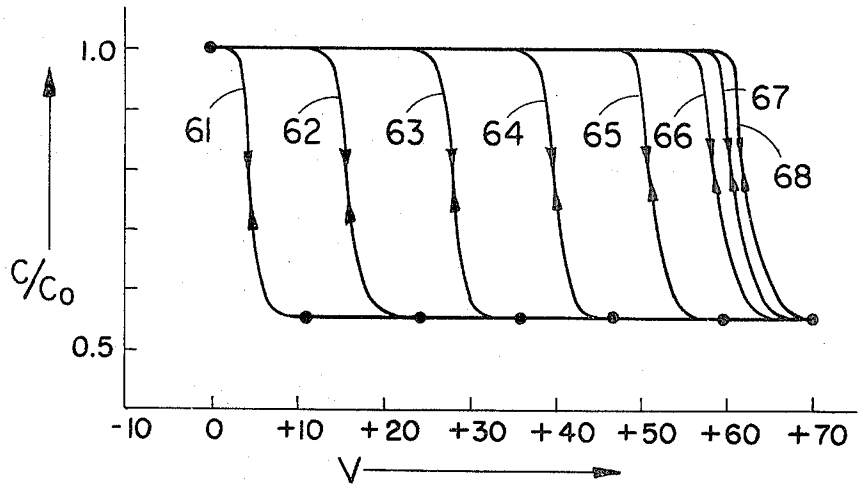

To further clearly confirm this fact further clearly that the curve shift is caused regardless of the polarity of the applied voltage, a 50 Hz AC voltage was applied across electrodes 13 and 14 of diode 10 (FIG. 1). The experimental results are as shown in FIG. 4, which is similar to FIGS. 2 and 3, except that the abscissa indicates the effective value of the applied AC voltage. Curve 61 show the *c–v* curve measured of a sample to which lower-than-15 volt AC voltage is applied for a minute. Similarly, curves 62 to 68 show the curves observed on samples to which 20 V., 40 V., 60 V., 70 V., 80 V., 90 V., and 100 V., are applied for 1 minute, respectively. It is clearly shown by these curves that the shift in curves is always made rightward even for AC voltages.

Figure 5:
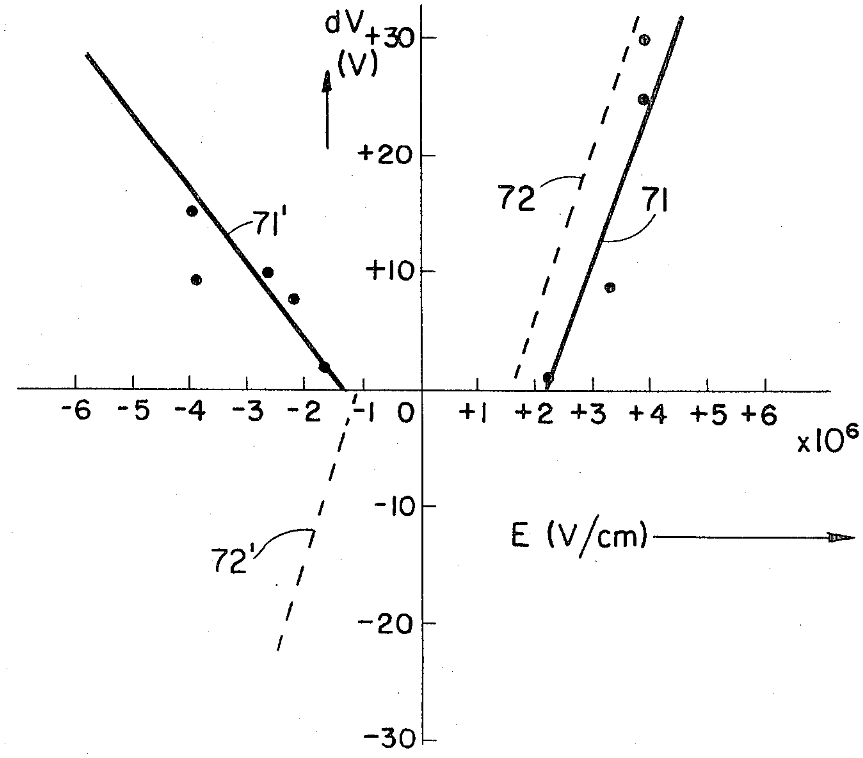
FIG. 5 illustrates further characteristic curves to illustrate the comparison between the device of the present invention and a conventional device.

This peculiar characteristic of the diode 10 of the invention is further illustrated in FIG. 5, in which the abscissa indicates electric field intensity within the gate insulator and the ordinate indicates the shift *dv* in the *c–v* curves. Solid curves 71 and 71′ show the characteristics of the present device, while broken lines 72 and 72′ show these characteristics of a conventional MIS device employing $Si_3N_4$ film as the gate insulator film. When the field intensity increases in proportion to the applied voltage, the *c–v* curve shift *dv* shows no change at its initial stage. Beyond the critical field $2.2\times10^6$ v./cm., however, the shift dv exhibits a virtually linear increase with the field intensity, as shown by curve 71. A similar change is observed in the conventional device as shown by curve 72. As regards the device of the present device, a similar shift is also observed in the region of negative increase in the field intensity, as shown by curve 71′. In contrast, the conventional device exhibits a shift in the opposits direction in the region of negative increase, as shown by curve 72′. Curves 71′ and 72′ clearly show the difference in the carrier trapping property between the device of the present invention and a conventional device. More specifically, a present device exhibits the positive shift of the *c–v* curves regardless of the polarity of the applied voltage, while the conventional device shows a shift which is dependent on the polarity of the applied voltage. In other words, the *c–v* curve shift is reversible in the conventional device and in contrast, is not reciprocal in the device of the invention. It will thus be apparent that the latter device is suited for use as a non-destructive memory.

Figure 6:
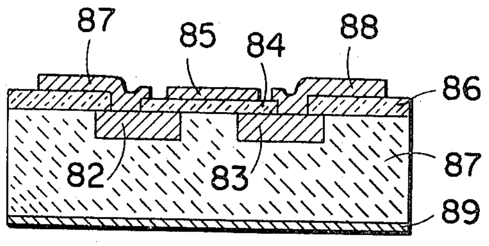
FIG. 6 is a cross-sectional view of a MIS type field effect transistor manufactured according to the invention.

The same process of forming the alumina film may be applied to a MIS field effect transistor (FET). Referring to FIG. 6, a MIS FET 80 according to this invention has a p-type silicon substrate 81 of 2 ohm-cm in resistivity, highly doped n-type drain and source regions 82 and 83 formed in the substrate 81, a 2,000-angstrom-thick alumina film 84 formed by the above-described process, a gate electrode film 85 formed on the film 84, and drain and source electrodes 87 and 88 formed on an insulater film 86 in ohmic contact with drain and source regions 82 and 83, respectively. The process of manufacturing this FET is quite similar to that for conventional devices, with the exception of the step of forming the alumina film, which is identical to that process described above for the film 12 of the device 10 (FIG. 1). In the FET 80, the channel region defined by drain and source regions 82 and 83, is 15-microns wide and 800-microns long. In operation, the width and length of the defined region correspond to the channel length and width of the FET 80, respectively.

Figure 7:
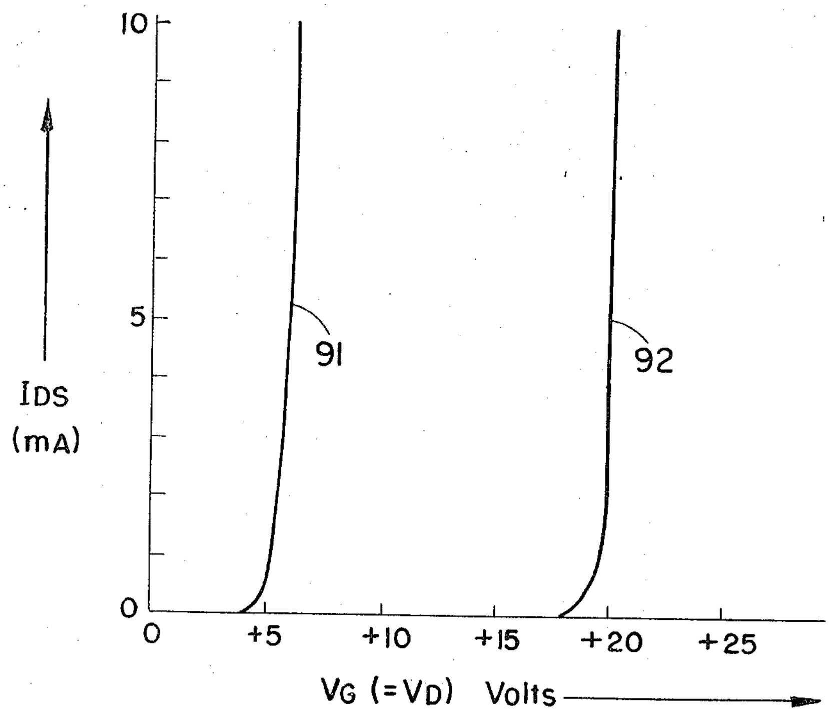
FIG. 7 shows a characteristic curve of the transistor of FIG. 6.

The drain-source current vs. drain voltage characteristics of the FET 80 is as shown in FIG. 7, in which the drain-source current is indicated along the ordinate and the gate voltage is indicated along the abscissa. The change in the drain-source current as a function of the gate voltage change is plotted by curve 91, for a sample which is not subjected to the initial application of the a gate voltage higher than the critical value. On the contrary, when +50 V. DC voltage higher than the critical value (+35 V.) is applied at the gate electrode in advance of the measurement, the drain-source current vs. gate voltage curve becomes that shown by curve 92. It has been experimentally confirmed that the critical voltage across the alumina film 84 is substantially the same as that observed for the diode 10 of FIG. 1. In other words, the rightward shift of the *c–v* curves illustrated in FIGS. 2, 3 and 4 clearly corresponds to the shift in the drain-source current vs. gate voltage characteristic curve shown in FIG. 7. The rightward shift from curve 91 to curve 92 has been observed even when the initial gate setting voltage was beyond the critical voltage in the negative voltage region. Furthermore, the shift in the curve in FIG. 7 was confirmed as being unreciprocal, once an initial gate setting voltage higher than the critical value has been applied. These phenomena clearly correspond to those observed for the diode 10 of FIG. 1 and are attributed to the permanent traps formed in the alumina film 84 peculiar to this invention. The curve 91 may be called the ON state in which the FET is easily set to a conductive state with a relatively low gate voltage. In contrast, the curve 92 may be called the OFF state where the FET is not turned conductive until the gate voltage reaches about +20 V. These two distinct states make the FET usable as a memory cell of the non-destructive read-only memory system.

As will be well understood from the foregoing description, the MIS diode and MIS FET manufactured according to the present invention can be used as an ideal memory cell for a non-destructive read-only memory.

As in the case of the conventional $Si_3N_4$—$SiO_2$ structure of the insulator film of the conventional FET for memory use, a $SiO_2$ film of about 200 angstrom in thickness may be formed beneath or on the alumina film 12 or 84, through the known pyrolytic or vapor-phase deposition process.

The $SiO_2$ film in the conventional film is known to serve to stabilize the function of the $Si_3N_4$ film and to define the critical value for causing a shift in the critical value. In the present invention, it has been found that the $SiO_2$ film formed beneath the $Al_2O_3$ film resulted in a lowering of the gate threshold voltage for the initial state. Similar effect of the $SiO_2$ film on the $Al_2O_3$ film was observed in the case where the $SiO_2$ film was formed on the $Al_2O_3$ film.

The silicon substrate may be replaced by a germanium substrate. However, for high temperature operation, silicon is more favorable.

Alumina film employed in the present devices as the gate insulator film serves also as a protective film for the substrate, because it is more effective than the $SiO_2$ film of the conventional devices in preventing sodium ions from contaminating the substrate.

While only a few embodiments have been disclosed, it will be apparent that various modifications may be made therein without departing from the spirit and scope of the invention.

What is claimed is:

A metal-insulator-semiconductor type memory device comprising a semiconductor substrate, an alumina film formed on a first portion of the surface of said substrate, a first metal film formed on said alumina film, and a second metal film formed on a second portion of the surface of said substrate, voltage means applied between said first and second metal films for injecting negative charge carriers into said alumina film, said voltage means above a critical value substantially permanently trapping said charge carriers in said alumina film.

2. A metal-insulator-semiconductor type field effect transistor for memory use comprising a semiconductor substrate of one conductivity type, first and second regions of opposite conductivity type formed in said substrate, an alumina film formed on the surface of said substrate defined by said first and second regions extending to cover at least a portion of said surface between said first and second regions, a gate electrode formed on said alumina film, drain and source electrodes in ohmic contact respectively with said first and second regions, and a metal film formed in direct contact with said substrate, voltage means applied to said gate electrode for injecting negative charge carriers into said alumina film from one of said gate electrode and substrate, said voltage means above a critical value substantially permanently trapping said charge carriers in said alumina film; whereby said transistor is operable in two distinct states as a function of the gate voltage before and after the application of said voltage means.

* * * * *